W. A. TURNER.
Seed-Drill.
No. 210,581.  Patented Dec. 3, 1878.
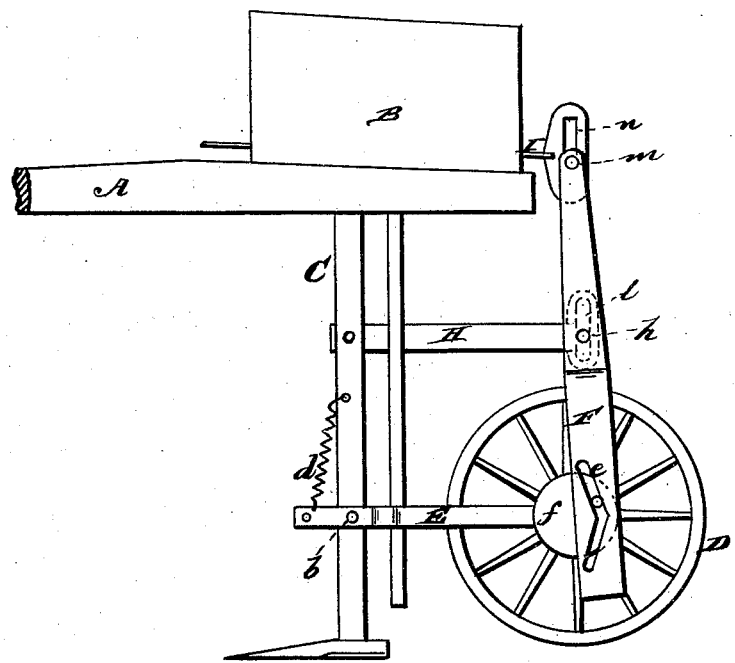
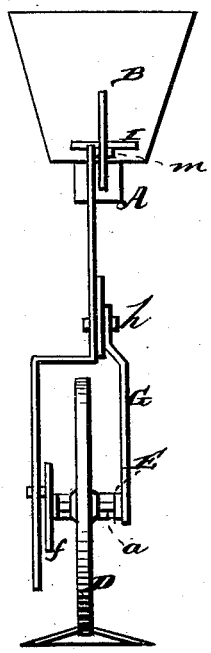
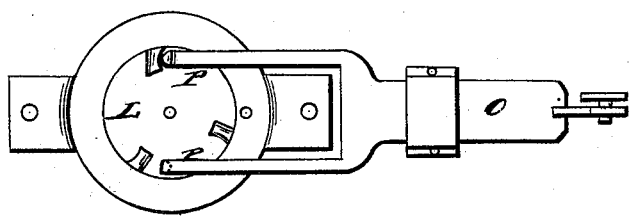
WITNESSES  INVENTOR.

UNITED STATES PATENT OFFICE.

WINFIELD A. TURNER, OF HIAWATHA, KANSAS.

IMPROVEMENT IN SEED-DRILLS.

Specification forming part of Letters Patent No. 210,581, dated December 3, 1878; application filed May 25, 1878.

*To all whom it may concern:*

Be it known that I, WINFIELD AUGUSTUS TURNER, of Hiawatha, in the county of Brown and State of Kansas, have invented a new and valuable Improvement in Seed-Drills; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my seed-drill. Fig. 2 is a rear view, and Fig. 3 is a bottom-plan view, of the seed-hopper.

The nature of my invention consists in the construction of a drill for planting corn and other seed, which can be attached to any plow used in getting the ground in order, so that it will plant the seed while the plow is running, thereby saving time and labor.

The annexed drawings, to which reference is made, fully illustrate my invention.

A represents the beam of a plow of any description, upon the rear end of which is fastened the seed hopper or box B. C represents the standard of the plow. D is a wheel of suitable dimensions, secured upon a short axle, $a$, which has its bearings in the rear ends of two arms, E E, that extend forward, one on each side of the standard C, and are pivoted thereto by a bolt or rivet, $b$. The front ends of the arms are connected together, and a spring, $d$, is attached to them, and connects with the beam or standard above, so as to hold the wheel down in the furrow and allow it to yield in passing over lumps or other obstructions.

On one end of the axle $a$ is formed or secured a crank or cam, $f$, which works in a slot, $e$, in the lower end of a lever, F. This lever extends upward, and is, above the wheel, pivoted by a bolt or rivet, $h$, to the upper end of a bar, G, which is rigidly secured at its lower end to the rear end of one of the arms E. The pivot $h$ passes through a slot, $i$, in the rear end of a bar, H, the front end of which is firmly secured to the standard C. This bar H acts as a brace, and allows the wheel to yield upward by the pivot $h$ passing through the slot $i$, as shown.

The upper end of the lever F is provided with a pin, $m$, which enters a slot, $n$, in the end of the dropping-slide I in the bottom of the seed-box, so that by the vibration of the lever F, caused by the revolution of the wheel D, the slide I obtains the required reciprocating motion. The lever F can equally as well be made to operate a slide, O, with prongs P at one end, so as to drive a rotary drop, L, if desired.

The part of the plow to which the arms E and brace H are attached depends, of course, upon the construction of the plow.

What I claim as new, and desire to secure by Letters Patent, is—

1. The wheel D and cam $f$, loosely pivoted to the plow-standard by arms E, in combination with the vibrating lever F, pivoted in the center, and provided with crooked slot $e$ to receive the cam-pin, and with a pin, $m$, to operate in slot $n$ of seed-slide I, as specified.

2. The combination of the pivoted arms E, carrying the wheel D, the spring $d$, lever F, bar G, and brace H, with slot $i$, substantially as and for the purposes set forth.

In testimony that I claim the above I have hereunto subscribed my name in the presence of two witnesses.

W. A. TURNER.

Witnesses:
D. L. BURGER,
J. D. BLAIR.